US009204364B2

(12) United States Patent
Lee et al.

(10) Patent No.: US 9,204,364 B2
(45) Date of Patent: Dec. 1, 2015

(54) METHOD AND APPARATUS FOR PROVIDING SIMULTANEOUS DATA TRANSMISSION SERVICE OVER TWO OR MORE NETWORKS

(71) Applicant: SK TELECOM CO., LTD., Seoul (KR)

(72) Inventors: Gyu Min Lee, Yongin-si (KR); Jeong Su Kim, Seongnam-si (KR); In Jang Jeong, Seoul (KR); Kyung Hoon Kim, Bucheon-si (KR)

(73) Assignee: SK TELECOM. CO., LTD., Seoul (KR)

( * ) Notice: Subject to any disclaimer, the term of this patent is extended or adjusted under 35 U.S.C. 154(b) by 225 days.

(21) Appl. No.: 13/926,559

(22) Filed: Jun. 25, 2013

(65) Prior Publication Data

US 2013/0286814 A1 Oct. 31, 2013

Related U.S. Application Data

(63) Continuation of application No. PCT/KR2012/004111, filed on May 24, 2012.

(30) Foreign Application Priority Data

Jun. 3, 2011 (KR) .......................... 10-2011-0054096
Jul. 4, 2011 (KR) .......................... 10-2011-0066021

(51) Int. Cl.
*H04B 7/00* (2006.01)
*H04W 40/34* (2009.01)
*H04W 76/02* (2009.01)
*H04L 12/707* (2013.01)

(52) U.S. Cl.
CPC ............ *H04W 40/34* (2013.01); *H04W 76/025* (2013.01); *H04L 45/22* (2013.01)

(58) Field of Classification Search
USPC ........................................................ 370/216
See application file for complete search history.

(56) References Cited

U.S. PATENT DOCUMENTS

| 2003/0161265 A1* | 8/2003 | Cao et al. ...................... 370/229 |
| 2007/0116012 A1* | 5/2007 | Chang et al. ............. 370/395.52 |
| 2008/0137568 A1* | 6/2008 | Ho et al. ...................... 370/310 |

FOREIGN PATENT DOCUMENTS

| JP | 2009004855 | 1/2009 |
| KR | 1020050017674 | 2/2005 |
| KR | 1020070008572 | 1/2007 |

(Continued)

OTHER PUBLICATIONS

Korean Office Action dated Jun. 20, 2012 for Application 10-2011-0054096, citing the above reference(s).

(Continued)

*Primary Examiner* — Edan Orgad
*Assistant Examiner* — Sithu Ko
(74) *Attorney, Agent, or Firm* — Hauptman Ham, LLP

(57) ABSTRACT

The heterogeneous network based-simultaneous data transmission service method includes identifying an access state with a reception device by a network device configured to relay data transmission/reception between a particular reception device and a particular transmission device, the network device being located in a particular network, when the access state with the reception device is abnormal, making a request for re-routing particular data transmitted from the transmission device to the reception device, and when the transmission device configured to transmit/receive particular partial data divided from one particular data through two or more network interfaces receives the re-routing request from the network device corresponding to a particular network interface, transmitting the particular partial data according to the re-routing request to the reception device through another network interface of the two or more network interfaces.

17 Claims, 7 Drawing Sheets

(56) References Cited

FOREIGN PATENT DOCUMENTS

| | | |
|---|---|---|
| KR | 1020070041096 | 4/2007 |
| KR | 1020090080742 | 7/2009 |

OTHER PUBLICATIONS

International Search Report mailed Nov. 28, 2012 for PCT/KR2012/004111, citing the above reference(s).

* cited by examiner

METHOD AND APPARATUS FOR PROVIDING SIMULTANEOUS DATA TRANSMISSION SERVICE OVER TWO OR MORE NETWORKS

CROSS-REFERENCE TO RELATED APPLICATION

The present application is a continuation of International Application No. PCT/KR2012/004111 filed on Jun. 12, 2012, which is based on, and claims priorities from, KR Application Serial Number 10-2011-0054096, filed on Jun. 3, 2011 and KR Application Serial Number 10-2011-0066021, filed on Jul. 4, 2011. The disclosures of the above-listed applications are hereby incorporated by reference herein in their entirety.

FIELD

The present disclosure relates to a method and an apparatus for simultaneously transmitting/receiving data over heterogeneous networks, where one data is divided and the divided data is transmitted/received through a plurality of heterogeneous networks.

BACKGROUND

The statements in this section merely provide background information related to the present disclosure and may not constitute prior art.

Recently, a service provider simultaneously provides services based on a plurality of wireless technologies in many cases. A main domestic service provider has introduced WCDMA, CDMA, WiBro, and a WLAN (WiFi) technology corresponding to a wireless local area network to construct and service a network. Further, currently, a Long Term Evolution (LTE) network is actively introduced.

The inventor(s) have experienced that in a heterogeneous network environment where various networks coexist, a current method in which a terminal device uses a data service through the heterogeneous network may correspond to a passive method in that the method is an access network selection method by a direct change by a terminal device user which excludes a service provider's controllability when a service provider side is considered.

Meanwhile, at present, as various wireless devices such as a smart phone, a tablet PC and the like increase, a data service charge decreases, and various large-capacity data services increase, a network load rate of the service provider rapidly increases, and thus network investment costs are excessively spent and service stability is threatened.

Accordingly, the inventor(s) have noted that a new service method of actively selecting an access network of the terminal device according to a network status in the heterogeneous network environment where various networks coexist and efficiently transmitting data by using the selected network is required.

SUMMARY

In accordance with some embodiments, a network device is configured to perform simultaneous data transmission based on two or more networks in a heterogeneous network. The network device comprises a data relay unit and a re-routing controller. The data relay unit is configured to relay transmission/reception of partial data divided from data to be transmitted between a transmission device and a reception device, the transmission device and the reception device configured to transmit/receive data through the two or more networks. And a re-routing controller is configured to make a request to the transmission device for re-routing the partial data, which is to be transmitted to the reception device over one of the two or more networks and which is related to an abnormal state, over another network of the two or more networks when a access state with the reception device through the one network is the abnormal state.

In accordance with some embodiments, a transmission device comprises a multi communication unit and a controller. The multi communication unit is configured to communicate with two or more network interfaces in a heterogeneous network. And the controller is configured to transmit partial data divided from data to be transmitted to a reception device through the two or more network interfaces and through corresponding network devices, and transmit partial data, which is to be transmitted to the reception device through one of the two or more network interfaces and which is related to a re-routing request, through another network interface of the two or more network interfaces when the re-routing request is received from the network device corresponding to the one network interface.

In accordance with some embodiments, a reception device comprises a multi communication unit and a controller. The multi communication unit is configured to communicate with two or more network interfaces corresponding to two or more networks in a heterogeneous network. And the controller is configured to control the multi communication unit to receive partial data divided from data to be transmitted from a transmission device through the two or more network interfaces and through corresponding network devices, and to receive partial data, which is to be transmitted to the reception device through one of the two or more network interfaces and which is related to a re-routing request provided to the transmission device from the network device corresponding the one network interface, through another network interface of the two or more network interfaces.

In accordance with some embodiments, the network device performs a method of operating a network device for a simultaneous data transmission service over two or more networks in a heterogeneous network. The network device is configured to identify an access state of partial data with a reception device over one of the two or more networks, the partial data divided from data to be transmitted from a transmission device to the reception device via the network device, and to make a request to the transmission device for re-routing the partial data, which is to be transmitted to the reception device over the one network and which is related to an abnormal state, over another network of the two or more networks when the access state is the abnormal state.

In accordance with some embodiments, the transmission device performs a method of operating a management device. The transmission device is configured to partial data divided from data to be transmitted to a reception device through two or more network interfaces corresponding to two or more networks in a heterogeneous network and through corresponding network devices, and to re-rout partial data by transmitting to the reception device partial data, which is to be transmitted to the reception device through one of the two or more network interfaces and which is related to a re-routing request, through another network interface of the two or more network interfaces when the re-routing request is received from the network device corresponding to the one network interface.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, some embodiments of the present disclosure will be described with reference to the accompanying drawings.

Figure 1:
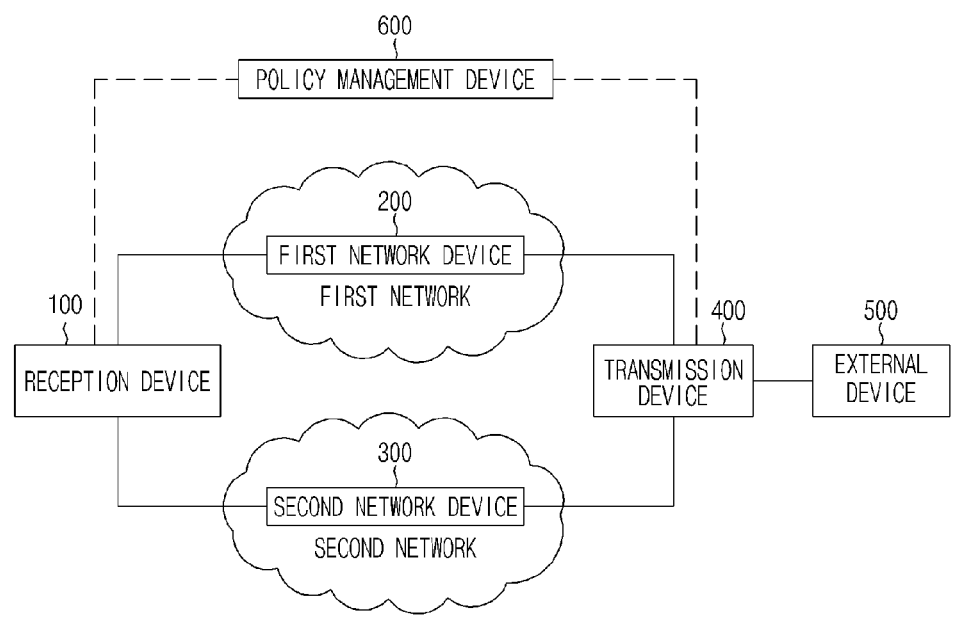
FIG. 1 is a schematic block diagram of a heterogeneous network-based simultaneous data transmission service system according to at least one embodiment of the present disclosure.

FIG. 1 is a schematic block diagram of a heterogeneous network-based simultaneous data transmission service system according to at least one embodiment of the present disclosure.

As illustrated in FIG. 1, the heterogeneous network based-simultaneous data transmission service system according to the present disclosure includes network devices 200 and 300 configured to relay data transmission/reception between a reception device 100 and a transmission device 400 and make a request for re-routing data transmitted from the transmission device 400 to the reception device 100 when a connection state with the reception device 100 is abnormal, the network devices being located in particular networks, and the transmission device 400 configured to transmit/receive partial data divided from one data to/from the reception device 100 through two or more network interfaces (i.e., network devices 200 and 300) and when receiving a re-routing request from the network device 200 or 300 corresponding to a network interface (i.e., network devices) of the two or more network interfaces, transmit the corresponding partial data according to the re-routing request to the reception device 100 through another network interface of the two or more network interfaces. In some embodiments, e.g., in a downlink process, the reception device 100 may include a terminal device on the client side, and the transmission device 400 may include a management device on the server side. In further embodiments, e.g., in an uplink process, the terminal device is configured to function as the transmission device 400 and the management device is configured to function as the reception device 100.

Further, the heterogeneous network based-simultaneous data transmission service system according to the present disclosure includes an external device 500 configured to receive the combined data from the transmission device 400 and a policy management device 600 configured to provide a network selection policy.

Accordingly, a heterogeneous network-based simultaneous data transmission service according to the present disclosure implements configurations of dividing data and transmitting/receiving the divided data by using a plurality of heterogeneous networks (for example, a 3G network and a WiFi network) in data transmission/reception between the reception device 100 and the external device 500.

The external device 500 refers to a server device for performing data transmission/reception with the reception device 100 through the transmission device 400, and can provide various services such as a portal service, a content providing service and the like to the reception device 100 through the data transmission/reception by the transmission device 400.

Further, the policy management device 600 determines a network selection policy based on various network parameters on the heterogeneous network including, for example, a subscriber preference, a subscriber type, a subscription payment system, an application type to be serviced and the like, and network status information according to a network status change received from the reception device 100 and the transmission device 400. And the policy management device 600 provides the determined network selection policy to the reception device 100 and the transmission device 400.

Meanwhile, the heterogeneous networks may correspond to various access networks including, for example, WCDMA, CDMA, WiBro, WLAN (WiFi), and Long Term Evolution (LTE), but in at least one embodiment the heterogeneous network will be exemplarily described, but not limited thereto, as a first network (hereinafter, referred to as a "3G network") which refers to a wireless packet service network (WCDMA) and a second network (hereinafter, referred to as a "WiFi network") which refers to a wireless local area network.

Accordingly, the first network device 200 refers to Gateway GPRS Support Node (GGSN) equipment for operating the 3G network, that is, the wireless packet service network, and the second network device 300 refers to an Access Point (AP) for operating the WiFi network, that is, the wireless local area network.

Further, the reception device 100 and the transmission device 400 can be a transmission device for dividing/transmitting data or a reception device for receiving/combining partial data according to a service flow, that is, a subject transmitting the data by using the simultaneous data transmission service, that is, an uplink process and a downlink process.

First, in order to use the simultaneous data transmission service in a heterogeneous network environment, a service registration process between the reception device 100 and the transmission device 400 is first performed.

In this connection, the reception device 100 is allocated its own first network access information on the 3G network (for example, a 3G IP) and its own second network access information on the WiFi network (for example, a WiFi IP).

For example, the reception device 100 can receive its own first network access information (for example, the 3G IP) from the first network device 200 according to a conventional access information allocation method by registering a position in the 3G network.

Further, the reception device 100 can receive its own second network access information (for example, the WiFi IP)

from the second network device 300 according to a conventional access information allocation method by accessing the WiFi network.

Thereafter, for the service registration process between the reception device 100 and the transmission device 400, the reception device 100 acquires access information (for example, a transmission device 3G IP) of the transmission device 400 for the access to the 3G network by which the reception device 100 can access the transmission device 400 through the first network, that is, the 3G network, and acquires access information (for example, a transmission device WiFi IP) of the transmission device 400 for the access to the WiFi network by which the reception device 100 can access the transmission device 400 through the second network, that is, the WiFi network.

At this time, acquiring/recognizing, by the reception device 100, the access information (for example, the transmission device 3G IP) of the transmission device 400 for the access to the 3G network and the access information (for example, the transmission device WiFi IP) of the transmission device 400 for the access to the WiFi network can be performed through various procedures.

Further, when the process of acquiring the access information of the transmission device 400 is completed, the service registration process between the reception device 100 and the transmission device 400 is performed.

In this connection, the reception device 100 accesses the transmission device 400 through at least one of the 3G network and the WiFi network based on the acquired access information for the access to the 3G and the acquired access information for the access to the WiFi network to make a request for the service registration.

For example, the reception device 100 accesses the transmission device 400 through the first network, that is, the 3G network based on the acquired access information (for example, the transmission device 3G IP) of the transmission device 400 for the access to the 3G network and transmits a binding update message to make the request for registering the reception device 100 itself. Then, the transmission device 400 performs the service registration of the reception device 100 by identifying additional information contained in the service registration request, for example, device identification information (for example, IMSI), first network access information (for example, the 3G IP), network type information (for example, the 3G network) indicating a network type through which the binding update message is transmitted, and service classification information (initial, update, and remove) and transmits a binding update response message (binding update ack) to the reception device 100, thereby performing the service registration process through the 3G network.

Further, the reception device 100 accesses the transmission device 400 through the second network, that is, the WiFi network based on the acquired access information (for example, the transmission device WiFi IP) of the transmission device 400 and transmits a binding update message to make a request for registering the reception device 100 itself. Then, the transmission device 400 performs the service registration of the reception device 100 by identifying additional information contained in the service registration request, for example, device identification information (for example, IMSI), second network access information (for example, the WiFi IP), network type information (for example, the WiFi network) indicating a network type through which the binding update message is transmitted, and service classification information (initial, update, and remove) and transmits a binding update response message (binding update ack) to the reception device 100, thereby performing the service registration process through the WiFi network.

The transmission device 400 can manage table information for each subscriber including, for example, the first network and second network access information (for example, the 3G IP and WiFi IP respectively) mapped based on device identification information (for example, IMSI) of the reception device (terminal device) service-registered for each subscriber, the service classification information (initial, update, and remove) and the like through the service registration process with the reception device 100, that is, based on the additional information included in the service registration request of the reception device 100 received through each of the 3G network and the WiFi network. Meanwhile, in addition to the table information for each subscriber, the transmission device 400 can manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network.

As described above, when all the processes for the service registration between the reception device 100 and the transmission device 400 are completed, a first network device (or a first network interface) through the 3G network and a second network device (or a second network interface) through the WiFi network are connected between the reception device 100 and the transmission device 400.

Further, for data transmission/reception between the reception device 100 and the external device 500, a simultaneous data transmission service through the heterogeneous networks, that is, the 3G network and the WiFi network is initiated.

First, the following description will be made based on an uplink process in which the reception device 100 corresponding to the transmission device transmits the data to the transmission device 400 corresponding to the reception device. For convenience of the description, the reception device 100 is mentioned and described as the terminal device and the transmission device 400 is mentioned and described as the management device in the uplink process.

The terminal device 100 (i.e, corresponding to the reception device 100 in the uplink process) divides the data to be transmitted into partial data to use the simultaneous data transmission service.

That is, the terminal device 100 is configured to divide the data to be transmitted into partial data corresponding to the number of networks for the simultaneous data transmission using the heterogeneous network environment, for example, the 3G network and the WiFi network, and the division process may be performed according to the network selection policy transmitted from the policy management device 600 or the changed traffic distribution rate for each of the networks received from the management device 400 according to real time network status monitoring.

In other words, the terminal device 100 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data of the divided partial data based on the identified transmission rates.

Accordingly, by performing the data division process based on the network selection policy and each of the traffic distribution rates changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the terminal device 100 is configured to transmit the first partial data through the first network interface (i.e., the first network device) and second partial data through the second network interface (i.e., the second network device).

That is, the terminal device 100 is configured to insert its own first network access information (for example, the 3G IP) corresponding to the corresponding first network into the first partial data and further insert access information of the management device 400 corresponding to the corresponding first network, that is, access information of the management device 400 for the access to the 3G network (for example, the management device 3G IP) and access information of the external device 500 corresponding to a final destination into the first partial data, and then transmit the first partial data.

Further, the terminal device 100 is configured to insert its own second network access information (for example, the WiFi IP) corresponding to the corresponding second network into the second partial data and further insert access information of the management device 400 corresponding to the corresponding second network, that is, access information of the management device 400 for the access to the WiFi network (for example, the management device WiFi IP) and access information of the external device 500 corresponding to a final destination into the second partial data, and then transmit the second partial data.

The first network device 200 located in the 3G network is configured to transmit the first partial data from the terminal device 100 to the management device 400 corresponding to the reception device.

Further, the second network device 300 located in the WiFi network is configured to transmit the second partial data from the terminal device 100 to the management device 400 corresponding to the reception device.

As described above, the first partial data divided by the terminal device 100 is transmitted to the management device 400 via the 3G network, and the divided second partial data is transmitted to the management device 400 via the WiFi network.

The management device 400 corresponding to the reception device is configured to receive the first partial data from the first network device 200 and the second partial data from the second network device 300, and reconstruct the data to be transmitted, which the terminal device 100 desires to transmit, by mixing/combining the first partial data and the second partial data from the terminal device 100 among the received first partial data and second partial data according to order information included in the corresponding partial data to generate the original data.

Further, the management device 400 is configured to transmit the reconstructed data to be transmitted to the external device 500 by using access information of the external device corresponding to the final destination recognized through at least one partial data of the first partial data and the second partial data.

As described above, the first partial data and the second partial data divided by the terminal device 100 are combined and reconstructed by the management device 400 during the process in which the first partial data and the second partial data pass through the management device 400 through the heterogeneous networks (the 3G and WiFi networks), that is, the first network interface and the second network interface, and the reconstructed data to be transmitted is transferred to the external device 500 which is the final destination as one data.

Next, the following description will be made based on a downlink process in which the transmission device 400 corresponding to the transmission device transmits the data to the reception device 100 corresponding to the reception device in connection with the simultaneous data transmission service process between the reception device 100 and the transmission device 400.

The transmission device 400 is configured to divide the data which is requested to be transmitted to the reception device 100 from the external device 500 into partial data to use the simultaneous data transmission service.

That is, the transmission device 400 is configured to divide the data to be transmitted into partial data corresponding to the number of networks for the simultaneous data transmission using the heterogeneous network environment, that is, the 3G network and the WiFi network, and the division process may be performed according to the network selection policy transmitted from the policy management device 600 or the traffic distribution rate for each of the networks changed according to the real time network status monitoring.

In other words, the transmission device 400 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data based on the identified transmission rates.

Accordingly, by performing the data division process based on the network selection policy and each of the traffic distribution rate changed in real time, the transmission device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the transmission device 400 is configured to identify the access information for each network (for example, the 3G IP and the WiFi IP) corresponding to the reception device 100 which is the final destination of the current data transmission based on pre-managed table information for each subscriber.

In addition, the transmission device 400 is configured to insert first network access information (for example, the 3G IP) of the reception device 100 corresponding to the corresponding first network into the first partial data, and insert second network access information (for example, the WiFi IP) of the reception device 100 corresponding to the corresponding second network into the second partial data.

Of course, the transmission device 400 can insert its own first network access information (for example, the transmission device 3G IP) corresponding to the corresponding first network and access information of the external device 500 corresponding to an initial originator into the first partial data.

Further, the transmission device 400 can insert its own second network access information (for example, the transmission device WiFi IP) corresponding to the corresponding second network and access information of the external device 500 corresponding to an initial originator into the second partial data.

Thereafter, the transmission device 400 transmits the first partial data to the reception device 100 corresponding to the reception device through the first network interface and transmits the second partial data to the reception device 100 corresponding to the reception device through the second network interface.

The first network device 200 located in the 3G network may transmit the first partial data from the transmission device 400 to the reception device 100 corresponding to the reception device.

Further, the second network device 300 located in the WiFi network may transmit the second partial data from the transmission device 400 to the reception device 100 corresponding to the reception device.

As described above, the data transmitted from the external device 500 is divided during the process in which the data passes through the transmission device 400, and the first partial data divided by the transmission device 400 is transmitted to the reception device 100 via the 3G network and the divided second data is transmitted to the reception device 100 via the WiFi network.

The reception device 100 corresponding to the reception device is configured to receive the first partial data from the first network device 200 and the second partial data from the second network device 300, and reconstruct the data to be transmitted, which the transmission device 400 desires to transmit, by mixing/combining the first partial data and the second partial data according to order information included in the corresponding partial to generate the original data.

As described above, the first partial data and second partial data divided by the transmission device 400 are transmitted to the reception device 100 through the heterogeneous networks (the 3G and WiFi networks), and the transmitted first partial data and second partial data are combined and then reconstructed by the reception device 100.

However, when the simultaneous data transmission service between the reception device 100 and the external device 500 through the heterogeneous networks is provided, unless the heterogeneous network interfaces between the reception device 100 and the transmission 400 are always maintained, any partial data of the partial data divided from one data may be lost.

For example, the second network, that is, the WiFi network interface has small coverage and frequently changed link characteristics due to its nature. Particularly, when the case where the transmission device 400 transmits the data to the reception device 100 through the WiFi network interface is considered, an access state of the reception device 100 through the WiFi network interface is abnormal, and thus service quality may not be guaranteed since the flow of the transmitted data, that is, the partial data is disconnected.

Accordingly, the present disclosure prevents in advance the expected concerned situation to guarantee seamless continuity in transmitting partial data to the reception device 100 when the simultaneous data transmission service through the heterogeneous networks between the reception device 100 and the external device 500 is provided, thereby achieving a configuration of maintaining service reliability and quality.

When the access state with the reception device 100 is abnormal through identification of the access state, the network devices 200 and 300 (hereinafter, only mentioned as the second network device 300 for convenience of the description) is configured to make a request for re-routing particular data transmitted from the transmission device 400 to the reception device 100.

That is, the second network device 300 is configured to identify the access state with the reception device 100 which accesses the second network device 300 through the network interface of the second network device 300, that is, the WiFi network interface. At this time, the second network device 300 can identify the access state with the reception device 100 on every preset identification period or identify the access state with the reception device 100 whenever partial data which is requested to be transmitted to the reception device 100 is received.

When the second network device 300 determines that the access state with the reception device 100 is abnormal, the second network device 300 can make a request for re-routing the particular data currently transmitted from the transmission device 400 to the reception device 100, that is, the partial data to the transmission device 400.

The transmission device 400 transmits/receives particular partial data divided from one particular data to/from the reception device 100 through the two or more network interfaces (for example, the 3G and WiFi networks) to provide the simultaneous data transmission service through the heterogeneous networks.

At this time, when the transmission device 400 receives the re-routing request from the network device corresponding to the particular network interface of the two or more network interfaces, the transmission device 400 is configured to transmit the corresponding partial data according to the re-routing request to the reception device 100 through another network interface of the two or more network interfaces.

That is, in order to provide the simultaneous data transmission service through the heterogeneous networks, the transmission device 400 is configured to provide the first partial data and second partial data divided from the data desired to be transmitted to the reception device 100 to the first network device 200 and the second network device 300 during the downlink process to attempt to transmit the first partial data and the second partial data through the heterogeneous network interfaces (for example, the 3G and WiFi networks).

At this time, when the transmission device 400 receives the re-routing request from the second network device 300 corresponding to the particular network interface (for example, the WiFi network), the transmission device 400 desires to transmit the corresponding partial data according to the re-routing request, that is, the second partial data to the reception device 100 through another network interface (for example, the 3G network) of the two or more network interfaces to provide the second partial data to the first network device 200 corresponding to the 3G network interface.

By re-routing the partial data desired to be transmitted through the particular network interface (for example, the WiFi network) of which the access state with the reception device 100 is abnormal among the heterogeneous network interfaces to the reception device 100 through another network interface (for example, the 3G network) of which the access state is normal, all the partial data divided from one data can be normally received by the reception device 100.

The reception device 100 is configured to reconstruct the data to be transmitted which the transmission device 400 desires to transmit by mixing/combining the first partial data and the second partial data according to order information included in the corresponding partial data to generate the original data. In some embodiments, the reception device 100, the first network device 200, the second network device 300, the transmission device 400, the external device 500 and/or the policy management device 600 include(s) one or more network interfaces including, but not limited to, cellular, Wi-Fi, LAN, WAN, CDMA, WCDMA, GSM, LTE and EPC networks, and cloud computing networks. Each of the reception device 100, the transmission device 400, the external device 500 and the policy management device 600 is implemented by one or more processors and/or application-specific integrated circuits (ASICs).

Figure 2:
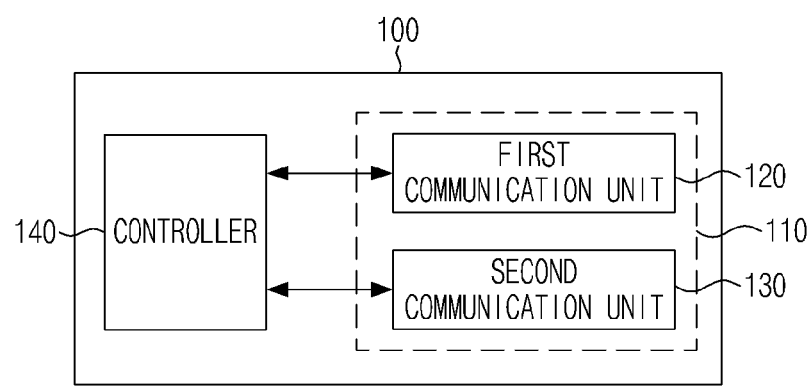
FIG. 2 is a schematic block diagram of a reception device according to at least one embodiment of the present disclosure.

Hereinafter, a configuration of the reception device according to the present disclosure will be described with reference to FIG. 2 in more detail. Further, the reception device according to the present disclosure may be the transmission device 400 of FIG. 1 when the uplink process is considered, or may be the reception device 100 of FIG. 1 when the downlink process is considered. However, the following description will be made based on the reception device 100 for convenience of the description.

The reception device 100 according to the present disclosure includes a multi communication unit 110 configured to communicate with (or support) two or more network interfaces corresponding to two or more networks, and a controller 140 configured to control the multi communication unit 110 to transmit/receive partial data divided from data to be transmitted to/from the transmission device 400 through the two or more network interfaces and receive partial data related to a re-routing request provided to the transmission device 400 from the network device 300 corresponding to a particular network interface of the two or more networks among the partial data from the transmission device 400 through another network interface of the two or more network interfaces other than the particular network interface.

The multi communication unit 110 is a communication function unit configured to communicate with (or support) two or more network interfaces through different two or more networks. For example, two networks will be mentioned and described. The multi communication unit 110 may include a first communication unit 120 configured to communicate with (or support) a first network and a second communication unit 130 configured to communicate with (or support) a second network.

Here, the first communication unit 120 is a communication module configured to communicate with (or support) the first network interface through the first network to transmit/receive data, and for example, may be a communication module for interworking with the first network device 200 by using the 3G network.

The second communication 130 is a communication module configured to communicate with (or support) the second network interface through the second network to transmit/receive data, and for example, may be a communication module for interworking with the second network device 300 by using the WiFi network.

The controller 140 is configured to control the multi communication unit 110 to transmit/receive the partial data divided from the data to be transmitted through the two or more network interfaces and receive the partial data related to the re-routing request provided to the transmission device 400 from the network device 300 corresponding to the particular network interface of the two or more networks among the partial data from the transmission device 400 through another network interface of the two or more network interfaces other than the particular network interface.

That is, the controller 140 transmits/receives the partial data divided from the data to be transmitted to/from the transmission device 400 through the two or more network interfaces (for example, the 3G and WiFi networks).

In other words, the controller 140 performs a service registration process with the transmission device 400 through the two or more heterogeneous networks, that is, the first network and the second network, is connected with the transmission device 400 through the first network interface, that is, the 3G network interface, and the second network interface, that is, the WiFi network interface, and transmits/receives the partial data divided from one data to/from the transmission device 400 through the connected 3G network interface and WiFi network interface, thereby performing the simultaneous data transmission service.

That is, during the uplink process in which the reception device 100 divides the data and transmits the first partial data via the first network device 200 through the 3G network interface and the second partial data via the second network device 300 through the WiFi network interface, the controller 140 divides the data desired to be transmitted to the transmission device 400 and transmits the first partial data to the transmission device 400 via the first network device 200 through the 3G network interface and the second partial data to the transmission device 400 via the second network device 300 through the WiFi network interface.

Meanwhile, during the downlink process in which the transmission device 400 divides/transmits the data requested to be provided to the reception device 100 from the external device 500, the controller 140 receives the first partial data through the 3G network interface and the second partial data through the WiFi network interface and generates/reconstructs the original data through a series of combination processes.

During the downlink process, the network device which recognizes that the access state of the reception device 100 is abnormal, that is, the second network device 300 makes a request for re-routing the partial data which is desired to be transmitted from the transmission device to the reception device 100 through the second network device 300 itself but fails the transmission, so that the transmission device 400 can transmit the partial data which is desired to be transmitted to the reception device 100 through the network interface (for example, the WiFi network) according to the second network device 300 to the reception device 100 through another network interface (for example, the 3G network).

The controller 140 can control the multi communication unit 110 to receive the partial data related to the re-routing request provided to the transmission device 400 by the second network device 300 corresponding to the particular network interface of the two or more network interfaces (for example, the 3G and WiFi networks), that is, the WiFi network among the partial data divided by the transmission device 400 from the transmission device 400 through another network interface of the two or more network interfaces other than the WiFi network, for example, through the 3G network.

As a result, the first partial data and second partial data divided by the transmission device 400 are transmitted to the reception device 100 through the heterogeneous networks (the 3G and WiFi networks), and the transmitted first partial data and second partial data are combined by the reception device 100, particularly, by the controller 140 of the reception device 140 and then reconstructed as the original data to be transmitted.

Figure 3:
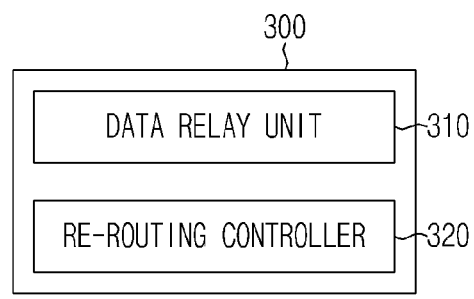
FIG. 3 is a schematic block diagram of a network device according to at least one embodiment of the present disclosure.

Hereinafter, a configuration of the network device according to the present disclosure will be described with reference to FIG. 3 in more detail. For convenience of the description, the reference numeral 300 between the first network device 200 and the second network device 300 will be mentioned and described.

The network device 300 according to the present disclosure includes a data relay unit 310 configured to relay transmission/reception (transmission and reception, and transmission or reception) of partial data divided from particular data between the reception device 100 accessing through a particular network and the particular transmission device 400. And the network device 300 also includes a re-routing controller 320 configured to, when an access state of the reception device 100 is abnormal, make a request for re-routing the partial data transmitted from the transmission device 400 to the reception device 100.

The data relay unit 310 is configured to relay data transmission/reception between the reception device 100 accessing through the particular network (for example, the WiFi network) in which the network device 300 is located and the particular transmission device 400 for the simultaneous data transmission service through the heterogeneous networks.

In other words, the data relay unit 310 relays the data transmission/reception between the reception device 100 accessing through the WiFi network interface and the transmission device 400, that is, transmission/reception of the particular partial data divided from the particular data.

For example, the data relay unit 310 relays the data transmission/reception between the reception device 100 and the transmission device 400 by providing the second partial data divided from one data to the reception device 400 when receiving the second partial data from the reception device 100 during the uplink process and providing the second partial data divided from one data to the reception device 100 when receiving the second partial data from the transmission device 400 during the downlink process.

When the access state of the reception device 100 is abnormal, the re-routing controller 320 is configured to make a request for re-routing particular partial data transmitted from the transmission device 400 to the reception device 100.

More specifically, the re-routing controller 320 is configured to monitor the access state of the reception device 100. At this time, the re-routing controller 320 can identify (and/or monitor) the access state with the reception device 100 at a particular identification time. For example, the re-routing controller 320 can identify (and/or monitor) the access state with the reception device 100 at every pre-set identification period time or identify (and/or monitor) the access state with the reception device 100 whenever the partial data which is requested to be transmitted to the reception device 100 is received.

The re-routing controller 320 is configured to determine that the access state of the reception device 100 is abnormal when at least one situation of a first situation in which a response corresponding to transmission to the reception device 100 exceeds a predefined delay threshold and a second situation in which a particular event recognized as access disconnection is generated occurs.

That is, as a result of identification of the access state with the reception device 100, when the first situation in which a response (for example, ack) reply time at which responses corresponding to various transmissions as well as the transmission of the particular data (for example, the second partial data) to the reception device 100 exceed the predefined delay threshold (for example, x sec) occurs, the re-routing controller 320 may determine that the access state is abnormal.

Alternatively, as a result of the identification of the access state with the reception device 100, when the second situation in which the predefined particular event (for example, no ack reply, identification of access termination or the like) recognized as the access disconnection with the reception device 100 is generated occurs, the re-routing controller 320 may determine that the access state of the reception device 100 is abnormal.

As a result of the determination, when the access state of the reception device 100 is abnormal, the re-routing controller 320 can make a request for re-routing the particular partial data (for example, the second partial data) transmitted from the transmission device 400 to the reception device 100.

In other words, the re-routing controller 320 can possess a particular re-routing policy including at least one of particular return address information and information on whether data is returned.

That is, the re-routing controller 320 can possess the re-routing policy including at least one of the return address information indicating an address of the device (for example, the transmission device 400) to which a re-routing request is provided and the information on whether the data is returned indicating whether the partial data of which the re-routing is to be requested is returned/provided. Further, the re-routing policy may include a policy for the identification time which is a basis of the identification of the access state with the reception device 100 and policies for various situations as well as the first situation and the second situation which are bases of the determination about whether the access state of the reception device 100 is abnormal.

Here, the re-routing policy is updated by at least one of the transmission device 400, a particular device (not shown) corresponding to the return address information, and the particular policy management device 600 which determines the network selection policy based on network status information of the two or more networks.

Hereinafter, at least one embodiment of the present disclosure in which the network device 300 possesses the re-routing policy through interworking with the transmission device 400 and then the re-routing policy is updated by the transmission device 400 will be described.

That is, when the access state of the reception device 100 is abnormal, the re-routing controller 320 possessing the re-routing policy through interworking with the transmission device 400 can provide a re-routing request including at least one of particular partial data transmitted from the transmission device 400 to the reception device 100 of which the return is to be requested, identification information of the partial data, device identification information of the reception device 100, and abnormal state information informing that the access state is abnormal to the particular device (for example, the transmission device 400) corresponding to the return address information according to the re-routing policy.

In a first embodiment, when the access state of the reception device 100 is abnormal, the re-routing controller 320 can provide the re-routing request including the device identification information (for example, IMSI) of the reception device 100 and the particular partial data transmitted from the transmission device 400 to the reception device 100 of which the re-routing is to be requested to the transmission device 400 according to the re-routing policy.

The network device 300 according to the present disclosure returns the currently received partial data to the transmission device 400 to make a request for re-routing the partial data whenever partial data requested to be transmitted to the reception device 100 of which the current access state is abnormal is received from the transmission device 400, so that the transmission device 400 can transmit the currently returned partial data to the reception device 100 through another network interface (for example, the 3G network).

Meanwhile, in a second embodiment, when the access state of the reception device 100 is abnormal, the re-routing controller 320 can provide the particular partial data transmitted from the transmission device 400 to the reception device 100 of which the re-routing is to be requested to the transmission device 400 as the re-routing request according to the re-routing policy.

The network device 300 according to the present disclosure returns the currently received partial data to the transmission device 400 to make a request for re-routing the partial data whenever partial data requested to be transmitted to the reception device 100 of which the current access state is abnormal is received from the transmission device 400, so that the transmission device 400 can transmit the currently returned partial data to the reception device 100 through another network (i.e., another network interface) (for example, the 3G network).

Meanwhile, in a third embodiment, when the access state of the reception device 100 is abnormal, the re-routing controller 320 can provide a re-routing request including at least one of device identification information (for example, IMSI) of the reception device 100 and identification information on the particular partial data transmitted from the transmission device 400 to the reception device 100 of which the re-routing is to be requested to the transmission device 400 according to the re-routing policy.

The network device 300 according to the present disclosure returns the identification information of the currently received partial data to the transmission device 400 to make a request for re-routing the partial data whenever partial data requested to be transmitted to the reception device 100 of which the current access state is abnormal is received from the transmission device 400, so that the transmission device 400 can transmit the corresponding partial data according to the currently returned identification information to the reception device 100 through another network interface (for example, the 3G network).

Meanwhile, in a fourth embodiment, when the access state of the reception device 100 is abnormal, the re-routing controller 320 can provide the re-routing request including the device identification information (for example, IMSI) of the reception device 100, the abnormal state information informing that the access state is abnormal, the particular partial data transmitted from the transmission device 400 to the reception device 100 of which the re-routing is to be requested, and the identification information of the partial data according to the re-routing policy.

The network device 300 according to the present disclosure reports abnormal state information informing the transmission device 400 that the current access state of the reception device 100 is abnormal to make a request for re-routing the partial data, so that the transmission device 400 can transmit the partial data to be transmitted to the reception device 100 through the network interface (for example, the WiFi network) according to the network device 300 to the reception device 100 through another network interface (for example, 3G network).

Further, when the access state of the reception device 100 is switched to an abnormal state from a normal state, the re-routing controller 320 can perform at least one operation of a first operation making a request, to the data relay unit 310, for normally relaying the particular partial data which is transmitted from the transmission device 400 to the reception device 100 to the reception device 100 and a second operation for providing normal state information of informing the corresponding device (for example, the transmission device 400) providing the re-routing request that the access state of the reception device 100 is switched to the normal state.

That is, referring to the first, second, and third embodiments, when the access state of the reception device 100 is switched to the normal state from the abnormal state, the re-routing controller 320 may perform the first operation for making a request for normally relaying the corresponding partial data to the reception device 100 to the data relay unit 310 without making a request for re-routing the particular data transmitted from the transmission device 400 to the reception device 100.

Accordingly, when receiving the second partial data divided from one data from the transmission device 400 in the downlink process, the data relay unit 310 may provide the second partial data to the reception device 100 of which the access state is normal to normally relay data transmission/reception between the reception device 100 and the transmission device 400.

Meanwhile, referring to the fourth embodiment, when the access state of the reception device 100 is switched to the normal state from the abnormal state, the re-routing controller 320 may perform the second operation for providing the normal state information of informing the corresponding device (for example, the transmission device 400) to which the re-routing request is provided that the access state of the reception device 100 is switched to the normal state.

The transmission device 400 having received the normal state information may stop the operation of transmitting the partial data to be transmitted to the reception device 100 through the network interface (for example, the WiFi network) according to the network device 300 to the reception device 100 through another network interface (for example, the 3G network) and transmit the partial data to the reception device 100 through the network interface (for example, the WiFi network) according to the network device 300.

Accordingly, when receiving the second partial data divided from one data from the transmission device 400 in the downlink process, the data relay unit 310 may provide the second partial data to the reception device 100 of which the access state is normal to normally relay data transmission/reception between the reception device 100 and the transmission device 400.

Figure 4:
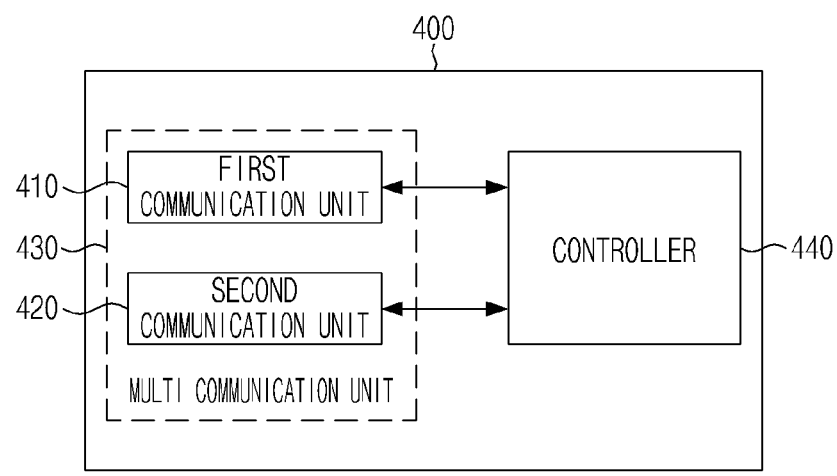
FIG. 4 is a schematic block diagram of a transmission device according to at least one embodiment of the present disclosure.

Hereinafter, a configuration of the transmission device according to the present disclosure will be described with reference to FIG. 4 in more detail.

The transmission device 400 according to the present disclosure includes a multi communication unit 430 configured to communicate with (or support) two or more network interfaces through two or more networks and a controller 440 configured to transmit/receive (transmit or receive, or transmit and receive) particular partial data divided from one particular data to/from the particular reception device 100 through the two or more network interfaces, and transmit a corresponding partial data according to the re-routing request to the reception device 100 through another network interface of the two or more network interfaces when the particular re-routing request is received from a network device corresponding to the particular network interface of the two or more network interfaces.

The multi communication unit 430 may be a communication function unit configured to communicate with (or support) the two or more network interfaces through two or more different networks. For example, two networks will be mentioned and described. The multi communication unit 430 may include a first communication unit 410 configured to communicate with (or support) a first network and a second communication unit 420 configured to communicate with (or support) a second network.

Here, the first communication unit 410 may be a communication module configured to communicate with (or support) a first network interface through the first network to transmit/receive data, and for example, a communication module for interworking with the first network device 200 by using the 3G network.

The second communication unit 420 may be a communication module configured to communicate with (or support) a second network interface through a second network to transmit/receive data, and for example, a communication module for interworking with the second network device 300 by using the WiFi network.

As discussed in the description with reference to FIG. 1, the controller 440 is configured to perform the service registration process with the reception device 100 through the two or more heterogeneous networks, that is, the first network and the second network, is connected with the reception device 100 through the first network interface, that is, the 3G network interface, and the second network interface, that is, the WiFi network interface, and transmit/receive partial data divided from one data to/from the reception device 100 through the connected 3G network interface and WiFi network interface, thereby perform the simultaneous data transmission service.

That is, during the uplink process in which the reception device 100 divides the data and transmits first partial data through the 3G network interface via the first network device 200 and second partial data through the WiFi network interface via the second network interface 300, the controller 440 receives the first partial data through the 3G network interface and receives the second partial data through the WiFi network interface to generate/reconstruct the original data through a series of combination processes.

Further, the controller 440 is configured to transmit the reconstructed data to the corresponding external device 500.

Meanwhile, during the downlink process in which the transmission device 400 divides/transmits data requested to be provided to the reception device 100 from the external device 500, the controller 440 may divide the data requested to be provided to the reception device 100 from the external device 500, and transmit the first partial data to the reception device 100 through the 3G network interface via the first network 200 and the second partial data through the WiFi network interface via the second network interface 300.

When receiving a particular re-routing request from the network device corresponding to the particular network interface of the two or more network interfaces, the controller 440 transmits the corresponding partial data according to the re-routing request to the reception device 100 through another network interface of the two or more network interfaces.

In a more detailed description, during the downlink process in which the controller 440 divides the data and transmits the first partial data to the reception device 200 through the 3G network interface via the first network device 200 and the second partial data to the reception device 100 through the WiFi network interface via the second network device 300, the controller 440 can receive the particular re-routing request from the network device 300 corresponding to the particular network interface (for example, the WiFi network).

At this time, the received re-routing request may include at least one of particular partial data (for example, the second partial data) to the reception device 100 of which the return is to be requested, identification information of the partial data, device identification information of the reception device 100, and abnormal state information for informing that the access state is abnormal.

When the re-routing request is received, the controller 440 can transmit the partial data included in the re-routing request to the terminal device through another particular network interface of the two or more network interfaces.

That is, as described in the first embodiment, when the re-routing request including the device identification information (for example, IMSI) of the reception device 100 and the particular partial data transmitted to the reception device 100 of which the re-routing is to be requested is received, the controller 440 can provide the partial data (for example, the second partial data) included in the re-routing request to the network device 200 of another particular network (for example, the 3G network) to transmit the partial data to the reception device 100 through another network interface (for example, the 3G network).

Accordingly, the transmission device 400 according to the present disclosure can divide the data, and transmit the first partial data to the reception device 100 through the 3G network interface and the second partial data to the reception device 100 through the WiFi network interface during the downlink process. When receiving the re-routing request, the transmission device 400 can transmit the corresponding partial data returned through the re-routing request to the reception device 100 through another network interface.

Meanwhile, as described in the second embodiment, when the particular partial data transmitted to the reception device 100 of which the re-routing is to be requested is received as the re-routing request, the controller 440 can analyze a transmission side address (for example, an address of the second network device 300) of the corresponding partial data (for example, the second partial data) according to the re-routing request and port information to identify the current partial data as the re-routed data, and provide the partial data (for example, the second partial data) to the network device 200 of another particular network (for example, the 3G network) to transmit the partial data to the reception device 100 through another network interface (for example, the 3G network).

Accordingly, the transmission device 400 according to the present disclosure can divide the data and transmit the first partial data to the reception device 100 through the 3G network interface and the second partial data to the reception device 100 through the WiFi network interface during the downlink process. When receiving the re-routing request, the transmission device 400 can transmit the corresponding partial data returned through the re-routing request to the reception device 100 through another network interface.

Meanwhile, as described in the third embodiment, when the re-routing request including the device identification information (for example, IMSI) of the reception device 100 and the identification information of the particular partial data transmitted from the transmission device 400 to the reception device 100 of which the re-routing is to be requested is received, the controller 440 can acquire the corresponding partial data (for example, the second partial data) according to the identification information of the partial data included in the re-routing request, and provide the acquired partial data to the network device 200 of another particular network (for example, the 3G network) to transmit the partial data to the reception device 100 through another network interface (for example, the 3G network).

Accordingly, the transmission device 400 according to the present disclosure can divide the data and transmit first partial data to the reception device 100 through the 3G network interface and the second partial data to the reception device 100 through the WiFi network interface during the downlink process. When receiving the re-routing request, the transmission device 400 can acquire the corresponding partial data according to identification information returned through the re-routing request from a past transmission history and transmit the acquired partial data to the reception device 100 through another network interface.

Meanwhile, as described in the fourth embodiment, when the re-routing request including the device identification information (for example, IMSI) of the reception device 100, the abnormal state information informing that the access state is abnormal, particular partial data transmitted from the transmission device 400 to the reception device 100 of which the re-routing is to be requested, and identification information on the partial data is received, the controller 440 can acquire the partial data including the re-routing request or the partial data according to the identification information included in the re-routing request, and provide the acquired partial data to the network device 200 of another particular network (for example, the 3G network) to transmit the partial data to the reception device 100 through another network interface (for example, the 3G network).

Thereafter, the controller 440 can recognize the abnormal access state of the reception device 100 based on the abnormal state information included in the re-routing request, and transmit at least one partial data to be transmitted to the reception device 100 through the network interface (for example, the WiFi network) through which the re-routing request is received to the reception device 100 through another particular network interface (for example, the 3G network) of the two or more network interfaces.

When the transmission device 400 according to the present disclosure recognizes the abnormal access state of the reception device 100 through the re-routing request, the transmission device 400 may divide the data and transmit the first partial data to the reception device 100 through the 3G network interface, and transmit the second partial data which is desired to be transmitted through the WiFi network interface to the reception device 100 through another network interface (for example, the 3G network) in the downlink process without transmitting the second partial data through the WiFi network interface of which the access state is abnormal.

Further, when the controller 440 receives normal state information informing that the access state of the reception device 100 is switched to the normal state from the network device 300, the controller 440 can recognize that the access state of the reception device 100 has switched to the normal state and then transmit the partial data to the reception device 100 through the network interface through which the normal state information is received.

That is, when the controller 440 recognizes that the access state of the reception device 100 has been switched to the normal state, the controller 440 may stop the operation of transmitting the second partial data desired to be transmitted through the WiFi network interface to the reception device 100 through another network interface (for example, the 3G network) without transmitting the second partial data through the WiFi network interface of which the access state is abnormal, and transmit the second partial data to the reception device 100 through the WiFi network interface again.

As described above, the heterogeneous network based-simultaneous data transmission service system according to the present disclosure implements a simultaneous data transmission service environment where one data is divided and the divided data is transmitted/received through a plurality of heterogeneous networks in data transmission/reception corresponding to the reception device, and particularly, transmits partial data of which transmission is attempted through the particular network interface (for example, the WiFi network) of which the access state with the reception device is abnormal to the reception device through another network interface by re-routing the partial data, thereby guaranteeing seamless continuity in transmitting each partial data to the reception device through heterogeneous networks and thus improving service reliability and quality.

Figure 5:
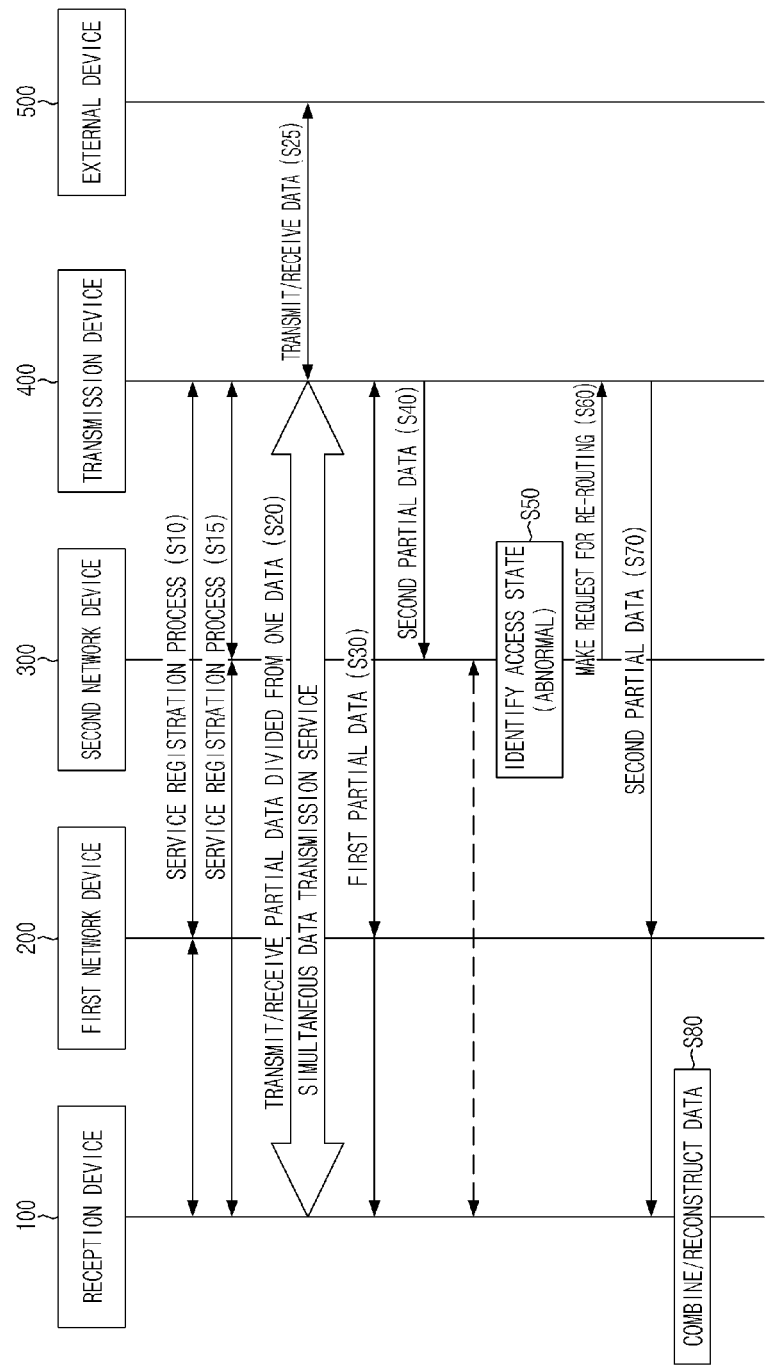
FIG. 5 is a flowchart of a method for providing a heterogeneous network-based simultaneous data transmission service according to at least one embodiment of the present disclosure.
Figure 6:
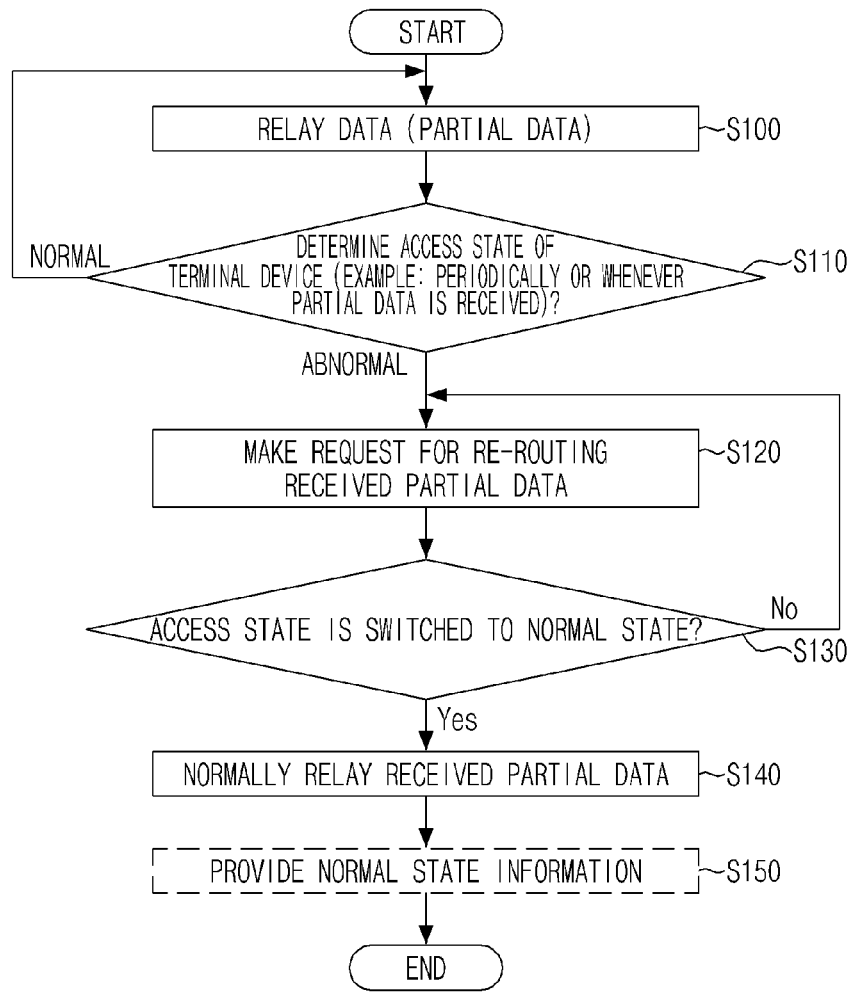
FIG. 6 is a flowchart of a method of operating a network device according to at least one embodiment of the present disclosure.
Figure 7:
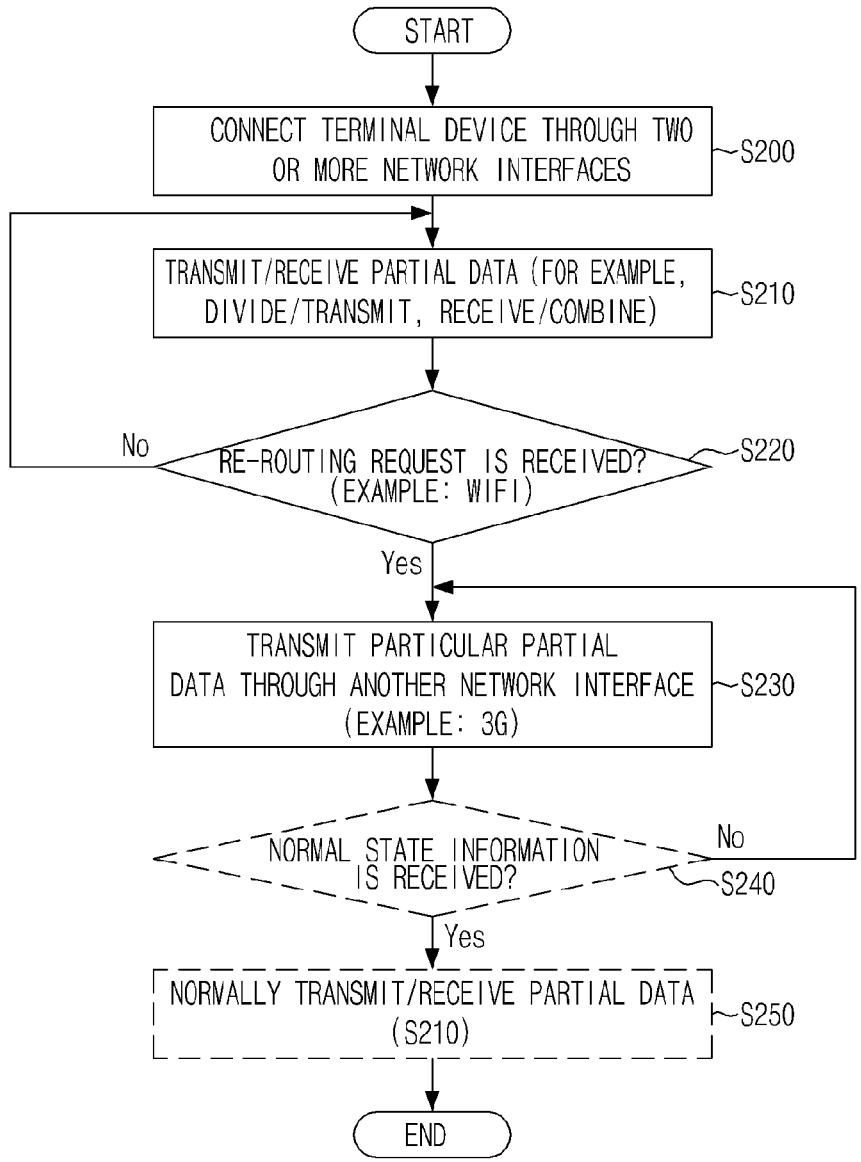
FIG. 7 is a flowchart of a method of operating a transmission device according to at least one embodiment of the present disclosure.

Hereinafter, a heterogeneous network based-data transmission method according to at least one embodiment of the present disclosure will be described with reference to FIGS. 5 to 7. Here, the same configurations described through FIGS. 1 to 4 will be mentioned and described using the corresponding reference numerals for convenience of the description.

First, a service process of the heterogeneous network based-simultaneous data transmission method according to at least one embodiment of the present disclosure will be described with reference to FIG. 5.

In order to use the simultaneous data transmission service in the heterogeneous network environment, a service registration process between the reception device 100 and the transmission device 400 is first performed in steps S10 and S15.

In this connection, the reception device 100 receives its own first network access information (for example, a 3G IP) of the 3G network and receives its own second network access information (for example, a WiFi IP) of the WiFi network.

Thereafter, for the service registration process between the reception device 100 and the transmission device 400, the reception device 100 acquires access information (for example, a transmission device 3G IP) of the transmission device 400 for the access to the 3G network by which the reception device 100 can access the transmission device 400 through the first network, that is, the 3G network, and acquires access information (for example, a transmission device WiFi IP) of the transmission device 400 for the access to the WiFi network by which the reception device 100 can access the transmission device 400 through the second network, that is, the WiFi network.

Further, when the process of acquiring the access information of the transmission device 400 is completed, the service registration process between the reception device 100 and the transmission device 400 is performed.

In this connection, the reception device 100 accesses the transmission device 400 through each of the 3G network and the WiFi network based on the acquired access information for the access to the 3G network and the acquired access information for the access to the WiFi network to make a request for the service registration.

For example, the reception device 100 accesses the transmission device 400 through the first network, that is, the 3G network based on the acquired access information (for example, the transmission device 3G IP) of the transmission device 400 for the access to the 3G network and transmits a binding update message to make the request for registering the reception device 100 itself. Then, the transmission device 400 performs the service registration of the reception device 100 by identifying additional information contained in the service registration request, for example, device identification information (for example, IMSI), first network access information (for example, the 3G IP), network type information (for example, the 3G network) indicating a network type through which the binding update message is transmitted, and service classification information (initial, update, and remove) and transmits a binding update response message (binding update ack) to the reception device 100, thereby performing the service registration process through the 3G network.

Further, the reception device 100 accesses the transmission device 400 through the second network, that is, the WiFi network based on the acquired access information (for example, the transmission device WiFi IP) of the transmission device 400 and transmits a binding update message to make a request for registering the reception device 100 itself. Then, the transmission device 400 performs the service registration of the reception device 100 by identifying additional information contained in the service registration request, for example, device identification information (for example, IMSI), second network access information (for example, the WiFi IP), network type information (for example, the WiFi network) indicating a network type through which the binding update message is transmitted, and service classification information (initial, update, and remove) and transmits a binding update response message (binding update ack) to the reception device 100, thereby performing the service registration process through the WiFi network.

The transmission device 400 can manage table information for each subscriber including, for example, the first network and second network access information (for example, the 3G IP and WiFi IP) mapped based on device identification information (for example, IMSI) of the reception device (terminal device) service-registered for each subscriber, the service classification information (initial, update, and remove) and the like through the service registration process with the reception device 100, that is, based on the additional information included in the service registration request of the reception device 100 received through each of the 3G network and the WiFi network in step 20. Meanwhile, in addition to the table information for each subscriber, the transmission device 400 can manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network for traffic discrimination.

As described above, when all the processes for the service registration between the reception device 100 and the transmission device 400 are completed, a first network interface through the 3G network and a second network interface through the WiFi network are connected between the reception device 100 and the transmission device 400.

Further, for data transmission/reception between the reception device 100 and the external device 500, a simultaneous data transmission service through the heterogeneous networks, that is, the 3G network and the WiFi network is performed in step S20.

First, the following description will be made based on an uplink process in which the reception device 100 corresponding to the transmission device transmits the data to the transmission device 400 corresponding to the reception device. For convenience of the description, the reception device 100 is mentioned and described as the terminal device and the transmission device 400 is mentioned and described as the management device.

The terminal device 100 divides the data to be transmitted into partial data to use the simultaneous data transmission service.

That is, the terminal device 100 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600 or the changed traffic distribution rate for each of the networks received from the management device 400 according to real time network status monitoring.

In other words, the terminal device 100 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data based on the identified transmission rates.

Accordingly, by performing the data division process based on the network selection policy and each of the traffic distribution rates changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the terminal device 100 transmits the first partial data through the first network interface in step S30 and second partial data through the second network interface in step S40.

That is, the terminal device 100 inserts its own first network access information (for example, the 3G IP) corresponding to the corresponding first network into the first partial data and further inserts access information of the management device 400 corresponding to the corresponding first network, that is, access information of the management device 400 for the access to the 3G network (for example, the management device 3G IP) and access information of the external device 500 corresponding to a final destination into the first partial data, and then transmits the first partial data.

Further, the terminal device 100 inserts its own second network access information (for example, the WiFi IP) corresponding to the corresponding second network into the first partial data and further inserts access information of the management device 400 corresponding to the corresponding second network, that is, access information of the management device 400 for the access to the WiFi network (for example, the management device WiFi IP) and access information of the external device 500 corresponding to a final destination into the second partial data, and then transmits the second partial data.

The first network device 200 located in the 3G network transmits the first partial data from the terminal device 100 to the management device 400 corresponding to the reception device.

Further, the second network device 300 located in the WiFi network transmits the second partial data from the terminal device 100 to the management device 400 corresponding to the reception device.

As described above, the first partial data divided by the terminal device 100 is transmitted to the management device 400 via the 3G network, and the divided second partial data is transmitted to the management device 400 via the WiFi network.

The management device 400 corresponding to the reception device receives the first partial data from the first network device 200 and the second partial data from the second network device 300 and reconstructs the data to be transmitted, which the terminal device 100 desires to transmit, by mixing/combining the first partial data and the second partial data from the terminal device 100 among the received first partial data and second partial data according to order information included in the corresponding partial data to generate the original data.

Further, the management device 400 transmits the reconstructed data to be transmitted to the external device 500 by using access information of the external device corresponding to the final destination recognized through at least one partial data of the first partial data and the second partial data in step S25.

As described above, the first partial data and the second partial data divided by the terminal device 100 are combined and reconstructed by the management device 400 during the process in which the first partial data and the second partial data pass through the management device 400 through the heterogeneous networks (the 3G and WiFi networks), that is, the first network interface and the second network interface, and the reconstructed data to be transmitted is transferred to the external device 500 which is the final destination as one data.

Next, the following description will be made based on a downlink process in which the transmission device 400 corresponding to the transmission device transmits the data to the reception device 100 corresponding to the reception device in connection with the simultaneous data transmission service process between the reception device 100 and the transmission device 400.

The transmission device 400 divides the data which is requested to be transmitted to the reception device 100 from the external device 500 in step S25 into partial data to use the simultaneous data transmission service.

That is, the transmission device 400 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600 or the traffic distribution rate for each of the networks changed according to the real time network status monitoring.

In other words, the transmission device 400 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data based on the identified transmission rates.

Accordingly, by performing the data division process based on the network selection policy and each of the traffic distribution rates changed in real time, the transmission device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network, and 100% of the 3G network and 0% of the WiFi network.

Further, the transmission device 400 identifies the access information for each network (for example, the 3G IP and the WiFi IP) corresponding to the reception device 100 which is the final destination of the current data transmission based on pre-managed table information for each subscriber.

In addition, the transmission device 400 inserts first network access information (for example, the 3G IP) of the reception device 100 corresponding to the corresponding first network into the first partial data and inserts second network access information (for example, the WiFi IP) of the reception device 100 corresponding to the corresponding second network into the second partial data.

Of course, the transmission device 400 can insert its own first network access information (for example, the transmission device 3G IP) corresponding to the corresponding first network and access information of the external device 500 corresponding to an initial originator into the first partial data.

Further, the transmission device 400 can insert its own second network access information (for example, the transmission device WiFi IP) corresponding to the corresponding second network and access information of the external device 500 corresponding to an initial originator into the second partial data.

Thereafter, the transmission device 400 transmits the first partial data to the reception device 100 corresponding to the reception device through the first network interface and transmits the second partial data to the reception device 100 corresponding to the reception device through the second network interface.

The first network device 200 located in the 3G network transmits the first partial data from the transmission device 400 to the reception device 100 corresponding to the reception device.

Further, the second network device 300 located in the WiFi network transmits the second partial data from the transmission device 400 to the reception device 100 corresponding to the reception device.

As described above, the data transmitted from the external device 500 is divided during the process in which the data passes through the transmission device 400, and the first partial data divided by the transmission device 400 is transmitted to the reception device 100 via the 3G network and the divided second data is transmitted to the reception device 100 via the WiFi network.

The reception device 100 corresponding to the reception device receives the first partial data from the first network device 200 and the second partial data from the second network device 300 and reconstructs the data to be transmitted, which the transmission device 400 desires to transmit, by mixing/combining the first partial data and the second partial data according to order information included in the corresponding partial to generate the original data.

As described above, the first partial data and second partial data divided by the transmission device 400 are transmitted to the reception device 100 through the heterogeneous networks (the 3G and WiFi networks), and the transmitted first partial data and second partial data are combined and then reconstructed by the reception device 100.

However, when the simultaneous data transmission service between the reception device 100 and the external device 500 through the heterogeneous networks is provided, unless the heterogeneous network interfaces between the reception device 100 and the transmission 400 are always maintained, any partial data of the partial data divided from one data may be lost.

For example, the second network, that is, the WiFi network interface has small coverage and frequently changed link characteristics due to its nature. Particularly, when the case where the transmission device 400 transmits the data to the reception device 100 through the WiFi network interface is considered, an access state of the reception device 100 through the WiFi network interface is abnormal, and thus service quality may not be guaranteed, such as disconnection of the flow of the transmitted data, that is, the partial data.

Accordingly, the present disclosure prevents in advance the expected concerned situation to guarantee seamless continuity in transmitting partial data to the reception device 100 when the simultaneous data transmission service through the heterogeneous networks between the reception device 100 and the external device 500 is provided, thereby achieving a configuration of maintaining service reliability and quality.

When the access state with the reception device 100 is abnormal through identification of the access state, the network devices 200 and 300 (hereinafter, only mentioned as the second network device 300 for convenience of the description) make a request for re-routing particular data transmitted from the transmission device 400 to the reception device 100.

That is, the second network device 300 identifies the access state with the reception device 100 which accesses the second network device 300 through the network interface of the second network device 300, that is, the WiFi network interface in step S50. At this time, the second network device 300 can identify the access state with the reception device 100 on every preset identification period or identify the access state with the reception device 100 whenever partial data which is requested to be transmitted to the reception device 100 is received.

When the second network device 300 determines that the access state with the reception device 100 is abnormal, the second network device 300 can make a request for re-routing the particular data currently transmitted from the transmission device 400 to the reception device 100, that is, the partial data to the transmission device 400 in step S60.

The transmission device 400 transmits/receives particular partial data divided from one particular data to/from the reception device 100 through two or more network interfaces (for example, 3G and WiFi networks) to provide the simultaneous data transmission service through the heterogeneous networks.

At this time, when the transmission device 400 receives the re-routing request from the network device corresponding to the particular network interface of the two or more network interfaces, the transmission device 400 transmits the corresponding particular data according to the re-routing request to the reception device 100 through another network interface of the two or more network interfaces.

That is, in order to provide the simultaneous data transmission service through the heterogeneous networks, the transmission device 400 provides the first partial data and second partial data divided from the data desired to be transmitted to the reception device 100 to the first network device 200 and the second network device 300 during a downlink process to attempt to transmit the first partial data and the second partial data through the heterogeneous network interfaces (for example, the 3G and WiFi networks) in steps S30 and S40.

At this time, when the transmission device 400 receives the re-routing request from the second network device 300 corresponding to the particular network interface (for example, the WiFi network), the transmission device 400 desires to transmit the corresponding partial data according to the re-routing request, that is, the second partial data to the reception device 100 through another network interface (for example, the 3G network) of the two or more network interfaces to provide the second partial data to the first network device 200 corresponding to the 3G network interface in step S70.

By re-routing the partial data desired to be transmitted through the particular network interface (for example, the WiFi network) of which the access state with the reception device 100 is abnormal among the heterogeneous network interfaces to the reception device 100 through another network interface (for example, the 3G network) of which the access state is normal, all the partial data divided from one data can be normally received by the reception device 100.

The reception device 100 reconstructs the data to be transmitted which the transmission device 400 desires to transmit by mixing/combining the first partial data and the second partial data according to order information included in the corresponding partial data to generate the original data in step S80.

Hereinafter, an operation method of the network device according to the present disclosure will be described with reference to FIG. 6 in more detail.

In the operation method of the network device according to the present disclosure, the network device relays data transmission/reception between the reception device 100 accessing through the particular network (for example, the WiFi network) in which the reception device 100 is located and the particular transmission device 400 for the simultaneous data transmission service through the heterogeneous networks in step S100.

In other words, the network relays the data transmission/reception device between the reception device 100 accessing through the WiFi network interface and the transmission device 400, that is, the transmission/reception of particular partial data divided from particular data.

For example, in the operation method of the network device according to the present disclosure, when second partial data divided from one data is received from the reception device 100 during the uplink process, the received second partial data is provided to the transmission device 400. When second partial data divided from the one data is received from the transmission device 400 during the downlink process, the received second partial data is provided to the reception device 100. As a result, the data transmission/reception between the reception device 100 and the transmission device is relayed.

When the access state of the reception device 100 is abnormal, in the operation method of the network device according to the present disclosure, the network device makes a request for re-routing the particular partial data transmitted from the transmission device 400 to the reception device 100.

More specifically, in the operation method of the network device according to the present disclosure, the network device monitors and determines the access state of the reception device 100 in step S110. At this time, the network device can identify/monitor the access state with the reception device 100 at a particular identification time. For example, the network device can identify/monitor the access state with the reception device 100 at every pre-set identification period time or identify/monitor the access state with the reception device 100 whenever the partial data which is requested to be transmitted to the reception device 100 is received.

In the operation method of the network device according to the present disclosure, the network device determines that the access state of the reception device 100 is abnormal when at least one situation of a first situation in which a response corresponding to transmission to the reception device 100 exceeds a predefined delay threshold and a second situation in which a particular event recognized as access disconnection is generated occurs.

That is, as a result of identification of the access state with the reception device 100, when the first situation in which a response (for example, ack) reply time at which responses corresponding to various transmissions as well as the transmission of the particular data (for example, the second partial data) to the reception device 100 are transmitted exceeds the predefined delay threshold (for example, x sec) occurs, the network device may determine that the access state is abnormal.

Alternatively, as a result of the identification of the access state with the reception device 100, when the second situation in which the predefined particular event (for example, no ack reply, identification of access termination or the like) recognized as the access disconnection with the reception device 100 is generated occurs, the network device may determine that the access state of the reception device 100 is abnormal.

As a result of the determination, when the access state of the reception device 100 is abnormal, the network device can make a request for re-routing the particular partial data (for example, the second partial data) transmitted from the transmission device 400 to the reception device 100 in step S120.

In other words, it is preferable that the network device possesses a particular re-routing policy including at least one of particular return address information and information on whether data is returned.

That is, the network device can possess the re-routing policy including at least one of the return address information indicating an address of the device (for example, the transmission device 400) to provide a re-routing request and the information on whether the data is returned indicating whether the partial data of which the re-routing is to be requested is returned/provided. Further, the re-routing policy may include a policy for the identification time which is a basis of the identification of the access state with the reception device 100 and policies for various situations as well as the first situation and the second situation which are bases of the determination about whether the access state of the reception device 100 is abnormal.

Here, it is preferable that the re-routing policy is updated by at least one device of the transmission device 400, a particular device (not shown) corresponding to the return address information, and the particular policy management device 600 which determines the network selection policy based on network status information of the two or more networks.

Hereinafter, at least one embodiment of the present disclosure in which the network device 300 possesses the re-routing policy through interworking with the transmission device 400 and then the re-routing policy is updated by the transmission device 400 will be described.

That is, when the access state of the reception device 100 is abnormal, the network device which possesses the re-routing policy through interworking with the transmission device 400 can provide a re-routing request including at least one of particular partial data to the reception device 100 of which the return received from the transmission device 400 is requested, identification information of the partial data, identification information of the reception device 100, and abnormal state information informing that the access state is abnormal to the particular device (for example, the transmission device 400) corresponding to the return address information according to the re-routing policy in step S120.

In a first embodiment, when the access state of the reception device 100 is abnormal, the network device can provide the re-routing request including the device identification information (for example, IMSI) of the reception device 100 and the particular partial data transmitted from the transmission device 400 to the reception device 100 of which the re-routing is requested according to the re-routing policy.

The network device 300 according to the present disclosure returns the currently received partial data to the transmission device 400 to make a request for re-routing the partial data whenever partial data requested to be transmitted to the reception device 100 of which the current access state is abnormal is received from the transmission device 400, so that the transmission device 400 can transmit the currently returned partial data to the reception device 100 through another network interface (for example, the 3G network).

Meanwhile, in a second embodiment, when the access state of the reception device 100 is abnormal, the network device can provide the particular partial data transmitted from the transmission device 400 to the reception device 100 of which the re-routing is to be requested to the transmission device 400 as the re-routing request according to the re-routing policy.

The network device 300 according to the present disclosure returns the currently received partial data to the transmission device 400 to make a request for re-routing the partial data whenever partial data requested to be transmitted to the reception device 100 of which the current access state is abnormal is received from the transmission device 400, so that the transmission device 400 can transmit the currently returned partial data to the reception device 100 through another network interface (for example, the 3G network).

Meanwhile, in a third embodiment, when the access state of the reception device 100 is abnormal, the network device can provide a re-routing request including device identification information (for example, IMSI) of the reception device 100 and identification information on the particular partial data transmitted from the transmission device 400 to the reception device 100 of which the re-routing is to be requested to the transmission device 400.

The network device 300 according to the present disclosure returns the identification information of the currently received partial data to the transmission device 400 to make a request for re-routing the partial data whenever partial data requested to be transmitted to the reception device 100 of which the current access state is abnormal is received from the transmission device 400, so that the transmission device 400 can transmit the corresponding partial data according to the currently returned identification information to the reception device 100 through another network interface (for example, the 3G network).

Meanwhile, in a fourth embodiment, when the access state of the reception device 100 is abnormal, the network device can provide the re-routing request including the device identification information (for example, IMSI) of the reception device 100, the abnormal state information informing that the access state is abnormal, the particular partial data transmitted from the transmission device 400 to the reception device 100 of which the re-routing is to be requested or the identification information of the partial data according to the re-routing policy.

The network device 300 according to the present disclosure reports abnormal state information informing the transmission device 400 that the current access state of the reception device 100 is abnormal to make a request for re-routing the partial data, so that the transmission device 400 can transmit the partial data to be transmitted to the reception device 100 through the network interface (for example, the WiFi network) according to the network device 300 to the reception device 100 through another network interface (for example, 3G network).

Further, when the access state of the reception device 100 is switched to a normal state from an abnormal state, the network device can perform at least one operation of a first operation for making a request, to the data relay unit 310, for normally relaying the particular partial data transmitted from the transmission device 400 to the reception device 100 to the reception device 100 and a second operation providing normal state information for informing the corresponding device (for example, the transmission device 400) providing the re-routing request that the access state of the reception device 100 is switched to the normal state.

That is, referring to the first, second, and third embodiments, when the access state of the reception device 100 is switched to the normal state from the abnormal state, the network device performs the first operation for making a request for normally relaying the corresponding partial data to the reception device 100 to the data relay unit 310 without making a request for re-routing the particular data transmitted from the transmission device 400 to the reception device 100 in step S140.

When receiving the second partial data divided from one data from the transmission device 400 in the downlink process, the network device provides the second partial data to the reception device 100 of which the access state is normal to normally relay data transmission/reception between the reception device 100 and the transmission device 400.

Meanwhile, referring to the fourth embodiment, when the access state of the reception device 100 is switched to the normal state from the abnormal state, the network device performs the second operation for providing the normal state information of informing the corresponding device (for example, the transmission device 400) providing the re-routing request that the access state of the reception device 100 is switched to the normal state in step S150.

The transmission device 400 having received the normal state information stops the operation of transmitting the partial data to be transmitted to the reception device 100 through the network interface (for example, the WiFi network) according to the network device 300 to the reception device 100 through another network interface (for example, the 3G network) and transmits the partial data to the reception device 100 through the network interface (for example, the WiFi network) according to the network device 300.

When receiving the second partial data divided from one data from the transmission device 400 in the downlink process, the network device provides the second partial data to the reception device 100 of which the access state is normal to normally relay data transmission/reception between the reception device 100 and the transmission device 400.

Hereinafter, an operation method of the transmission device according to the present disclosure will be described with reference to FIG. 7 in more detail.

In the operation method of the transmission device according to the present disclosure, the transmission device performs the service registration process with the reception device 100 through the two or more heterogeneous networks, that is, the first network and the second network, the reception device 100 is connected through the first network interface, that is, the 3G network interface, and the second network interface, that is, the WiFi network interface in step S200, and the transmission device transmits/receives partial data divided from one data to/from the reception device 100 through the connected 3G network interface and WiFi network interface, thereby performing the simultaneous data transmission service in step S210.

That is, during the uplink process in which the reception device 100 divides the data and transmits first partial data through the 3G network interface via the first network device 200 and second partial data through the WiFi network interface via the second network interface 300, the transmission device receives the first partial data through the 3G network interface and receives the second partial data through the WiFi network interface to generate/reconstruct the original data through a series of combination processes.

Further, the transmission device transmits the reconstructed data to the corresponding external device 500.

Meanwhile, during the downlink process in which the transmission device 400 divides/transmits data requested to be provided to the reception device 100 from the external device 500, the transmission device divides the data requested to be provided to the reception device 100 from the external device 500 and transmits the first partial data to the reception device 200 through the 3G network interface via the first network 200 and the second partial data through the WiFi network interface via the second network interface 300.

When receiving a particular re-routing request from the network device corresponding to the particular network interface of the two or more network interfaces in step S220, the transmission device transmits the corresponding partial data according to the re-routing request to the reception device 100 through another network interface of the two or more network interfaces in step S230.

In a more detailed description, during the downlink process in which the controller 440 divides the data and transmits the first partial data to the reception device 200 through the 3G network interface via the first network device 200 and the second partial data to the reception device 100 through the WiFi network interface via the second network device 300, the transmission device can receive the particular re-routing request from the network device 300 corresponding to the particular network interface (for example, the WiFi network) in step S220.

At this time, the received re-routing request may include at least one of particular partial data (for example, the second partial data) to the reception device 100 of which the return is to be requested, identification information of the partial data, device identification information of the reception device 100, and abnormal state information of informing that the access state is abnormal.

When the re-routing request is received, the transmission device can transmit the partial data included in the re-routing request to the terminal device through another particular network interface of the two or more network interfaces in step S230.

That is, as described in the first embodiment, when the re-routing request including the device identification information (for example, IMSI) of the reception device 100 and the particular partial data to the reception device 100 of which the re-routing is to be requested is received, the transmission device provides the partial data (for example, the second partial data) included in the re-routing request to the network device 200 of another particular network (for example, the 3G network) to transmit the partial data to the reception device 100 through another network interface (for example, the 3G network).

When the transmission device receives the particular re-routing request while maintaining the operation of dividing the data and transmitting the first partial data to the reception device 100 through the 3G network interface and the second partial data to the reception device 100 through the WiFi network interface during the downlink process, the transmission device can transmit the corresponding partial data returned through the re-routing request to the reception device 100 through another network interface and continuously maintain the operation of transmitting the first partial data to the reception device 100 through the 3G network interface and transmitting the second partial data to the reception device 100 through the WiFi network interface.

The transmission device 400 according to the present disclosure divides the data and transmits the first partial data to the reception device 100 through the 3G network interface and the second partial data to the reception device 100 through the WiFi network interface during the downlink process. When receiving the re-routing request, the transmission device 400 can transmit the corresponding partial data returned through the re-routing request to the reception device 100 through another network interface.

Meanwhile, as described in the second embodiment, when the particular partial data to the reception device 100 of which the re-routing is to be requested is received by the re-routing request, the transmission device analyzes a transmission side address (for example, an address of the second network device 300) of the corresponding partial data (for example, the second partial data) according to the re-routing request and port information to identify the current partial data as the re-routed data and provides the partial data (for example, the second partial data) to the network device 200 of another particular network (for example, the 3G network) to transmit the partial data to the reception device 100 through another network interface (for example, the 3G network).

The transmission device 400 according to the present disclosure divides the data and transmits the first partial data to the reception device 100 through the 3G network interface and the second partial data to the reception device 100 through the WiFi network interface during the downlink process. When receiving the re-routing request, the transmission device 400 can transmit the corresponding partial data returned through the re-routing request to the reception device 100 through another network interface.

Meanwhile, as described in the third embodiment, when the re-routing request including the device identification information (for example, IMSI) of the reception device 100 and the identification information of the particular partial data transmitted from the transmission device 400 to the reception device 100 of which the re-routing is to be requested is received, the transmission device can acquire the corresponding partial data (for example, the second partial data) according to the identification information of the partial data included in the re-routing request and provide the acquired partial data to the network device 200 of another particular network (for example, the 3G network) to transmit the partial data to the reception device 100 through another network interface (for example, the 3G network).

When the transmission device receives the particular re-routing request while maintaining the operation of dividing the data and transmitting the first partial data to the reception device 100 through the 3G network interface and the second partial data to the reception device 100 through the WiFi network interface during the downlink process, the transmission device can acquire the corresponding partial data according to the identification information returned through the re-routing request from a past transmission history, transmit the acquired partial data to the reception device 100 through another network interface, and continuously maintain the operation of transmitting the first partial data to the reception device 100 through the 3G network interface and transmitting the second partial data to the reception device 100 through the WiFi network interface.

Meanwhile, as describe in the fourth embodiment, when the re-routing request including the device identification information (for example, IMSI) of the reception device 100, the abnormal state information informing that the access state is abnormal, particular partial data to the reception device 100 from the transmission device 400 of which the re-routing is to be requested, and identification information on the partial data is received, the transmission device can acquire the partial data including the re-routing request or the partial data according to the identification information included in the re-routing request and provide the acquired partial data to the network device 200 of another particular network (for example, the 3G network) to transmit the partial data to the reception device 100 through another network interface (for example, the 3G network) in step S230.

Thereafter, the transmission device can recognize an abnormal access state of the reception device 100 based on the abnormal state information included in the re-routing request and transmit at least one partial data to be transmitted to the reception device 100 through the network interface (for example, the WiFi network) through which the re-routing request is received to the reception device 100 through the particular network interface (for example, the 3G network) of the two or more network interfaces.

When the transmission device 400 according to the present disclosure recognizes the abnormal access state of the reception device 100 through the re-routing request, the transmission device divides the data and transmits the first partial data to the reception device 100 through the 3G network interface and the second partial data which is desired to be transmitted through the WiFi network interface to the reception device 100 through another network interface (for example, the 3G network) without transmitting the second partial data through the WiFi network interface of which the access state is abnormal.

Further, according to the fourth embodiment, when the transmission device receives abnormal state information informing that the access state of the reception device 100 is switched to the normal state from the network device 300 in step S240, the transmission device can recognize that the access state of the reception device 100 has switched to the normal state and then transmit the partial data to the reception device 100 through the network interface through which the abnormal state information is received in step S250.

That is, when the transmission device recognizes that the access state of the reception device 100 has been switched to the normal state, the transmission device stops transmitting the second partial data, which is desired to be transmitted through the WiFi network interface during the downlink process, to the reception device 100 through another network interface (for example, the 3G network) without transmitting the second partial data through the WiFi network interface of which the access state is abnormal, and transmits the second partial data to the reception device 100 through the WiFi network interface again.

As described above, the heterogeneous network based-simultaneous data transmission service method according to the present disclosure implements a simultaneous data transmission service environment wherein one data is divided and the divided data is transmitted/received through a plurality of heterogeneous networks in data transmission/reception corresponding to the reception device, and particularly, transmits partial data of which transmission is attempted through the particular network interface (for example, the WiFi network) of which the access state with the reception device is abnormal to the reception device through another network interface by re-routing the partial data, thereby guaranteeing seamless continuity in transmitting each partial data to the reception device through heterogeneous networks and thus improving service reliability and quality.

According to the heterogeneous network based-simultaneous data transmission service method and apparatus, the present disclosure achieves a simultaneous data transmission service environment where one data is divided and the divided data is transmitted or received through a plurality of heterogeneous networks and guarantees seamless continuity to improve reliability and quality of the service by re-routing partial data of which transmission is attempted through a particular network interface (for example, the WiFi network) of which an access state with the reception device is abnormal to the reception device through another network interface in transmission of respective data to the reception device through heterogeneous networks.

Meanwhile, the methods or steps of the algorithm described related to the at least one embodiment of the present disclosure may be directly realized in the form of hardware, software executed by a processor, or a combination thereof. The software module may reside in a storage medium, such as a RAM memory, a flash memory, a ROM memory, an EPROM memory, an EEPROM memory, registers, a hard disc, a mobile disc, a CD-ROM, or other storage devices. The storage medium is connected to the processor, so that the processor may read information from the storage medium or record the information onto the storage medium. Alternatively, the storage medium can be integrated in the processor. The processor and the storage medium may be included in an application specific integrated circuits (ASIC). The ASIC may be included in one or more of the reception device, the first and second network devices, the transmission device, the policy management device, the external device and other hardware elements in the heterogeneous network(s). Alternatively, the processor and the storage medium may serve as components of one or more of the reception device, the first and second network devices, the transmission device, the policy management device, the external device and other hardware elements in the heterogeneous network(s).

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While the present disclosure has been shown and described with reference to certain embodiments thereof, it will be understood by those skilled in the art that various changes in form and details may be made therein without departing from the subject matter, the spirit and scope of the present disclosure. Specific terms used in this disclosure and drawings are used for illustrative purposes and not to be considered as limitations of the present disclosure.

What is claimed is:

1. A network device for simultaneous data transmission based on two or more networks in a heterogeneous network, the network device comprising:
   a data relay unit configured to relay transmission or reception of first partial data divided from data to be transmitted between a transmission device and a reception device, the transmission device configured to transmit data to the reception device through the two or more networks, the reception device configured to receive data from the transmission device through the two or more networks; and
   a re-routing controller configured to
      monitor an access state of the reception device to transmit the first partial data over a first network among the two or more networks, and
      transmit a request to the transmission device for re-routing the first partial data over at least one second network among the two or more networks when the re-routing controller identifies that the access state of the reception device through the first network is an abnormal state, to simultaneously transmit the first partial data and second partial data over the at least one second network,
   wherein the second partial data have been divided from the data, and are being transmitted over the at least one second network.

2. The network device of claim 1, wherein the re-routing controller is configured to determine that the access state is the abnormal state in at least one of:
   a first situation where a response corresponding to the first partial data transmitted to the reception device exceeds a predefined delay threshold, and
   a second situation where a particular event related to access disconnection with the reception device occurs.

3. The network device of claim 1, wherein the re-routing controller is configured to provide to the transmission device the re-routing request including at least one of:
   identification information of the first partial data related to the abnormal state,
   device identification information of the reception device, and
   abnormal state information informing that the access state is the abnormal state.

4. The network device of claim 1, wherein the re-routing controller is configured to perform at least one of:
   a first operation of transmitting a request to the data relay unit for relaying transmission or reception of the first partial data between the reception device and the transmission device, and
   a second operation of providing normal state information informing the transmission device that the access state of the reception device is switched to a normal state when the access state is switched to the normal state from the abnormal state.

5. The network device of claim 1, wherein the re-routing controller is configured to monitor the access state of the reception device at a particular identification time or when the first partial data which is requested to be transmitted to the reception device is received by the reception device.

6. A transmission device, comprising:
   a multi communication unit configured to communicate with two or more network interfaces corresponding to two or more networks in a heterogeneous network; and
   a controller configured to
      transmit first partial data and second partial data divided from data to be transmitted to a reception device through the two or more network interfaces and through corresponding network devices, and
      transmit the first partial data, which is to be transmitted to the reception device through a first network interface among the two or more network interfaces, through at least one second network interface among the two or more network interfaces when the controller receives a re-routing request from a network device corresponding to the first network interface, wherein the re-routing request indicates that an access state between the network device and the reception device is an abnormal state, wherein, in response to the re-routing request, the controller is configured to simultaneously transmit the first partial data and the second partial data over the at least one second network interface, and wherein the second partial data divided from the data are being transmitted over the at least one second network interface.

7. The transmission device of claim 6, wherein the first partial data related to the re-routing request is partial data related to at least one of:

a first situation where a response corresponding to the fist partial data transmitted to the reception device from the network device exceeds a predefined delay threshold, and a second situation where a particular event related to access disconnection with the reception device is generated.

8. The transmission device of claim 6, wherein the controller is configured to receive the re-routing request including at least one of identification information of the reception device and abnormal state information informing that the access state between the network device and the reception device is the abnormal state, and transmit the first partial data corresponding to the identification information of the reception device to the reception device through the at least one second network interface after receiving the re-routing request.

9. The transmission device of claim 8, wherein the controller is configured to transmit the first partial data to the reception device through the two or more network interfaces after receiving normal state information informing that the access state between the network device and the reception device is switched to a normal state.

10. The transmission device of claim 8, wherein the multi communication unit comprises:

a first communication unit configured to communicate with the first network interface of the two or more network interfaces to transmit or receive the first partial data; and a second communication unit configured to communicate with the second network interface of the two or more network interfaces to transmit or receive the second partial data.

11. A reception device, comprising:

a multi communication unit configured to communicate with two or more network interfaces corresponding to two or more networks in a heterogeneous network; and a controller configured to control the multi communication unit to receive first partial data and second partial data divided from data to be transmitted from a transmission device through the two or more network interfaces and through corresponding network devices, and receive the first partial data, which is to be received from the transmission device through a first network interface among the two or more network interfaces, through at least one second network interface among the two or more network interfaces when a network device corresponding to the first network interface transmits a re-routing request to the transmission device, wherein the re-routing request indicates than an access state of the reception device is an abnormal state, and causes the transmission device to simultaneously transmit the first partial data and the second partial data over the at least one second network interface, and wherein the second partial data divided from the data are being transmitted over the at least one second network interface.

12. A method performed by a network device for a simultaneous data transmission service over two or more networks in a heterogeneous network, the method comprising:

monitoring an access state of first partial data with a reception device over a first network among the two or more networks; and transmitting a request to the transmission device for re-routing the first partial data over at least one second network among the two or more networks when the access state of the first partial data through the first network is identified to be an abnormal state, to simultaneously transmit the first partial data and the second partial data over the at least one second network, wherein the first partial data and the second partial data have been divided form the data, and the second partial data are being transmitted over the at least one second network.

13. The method of claim 12, wherein the monitoring of the access state comprises determining that the access state is the abnormal state when at least one of:

a first situation where a response corresponding to the partial data transmitted to the reception device exceeds a predefined delay threshold, and a second situation where a particular event related to access disconnection with the reception device occurs.

14. The method of claim 12, further comprising:

monitoring the access state of the first partial data with the reception device at a particular identification time or when the first partial data which is requested to be transmitted to the reception device is received.

15. The method of claim 12, further comprising:

transmitting to the transmission device the re-routing request including at least one of:

identification information of the first partial data related to the abnormal state, device identification information of the reception device, and abnormal state information informing that the access state is the abnormal state.

16. A method performed by a transmission device for a simultaneous data transmission service over two or more networks in a heterogeneous network, the method comprising:

transmitting first partial data and second partial data divided from data to be transmitted to a reception device through two or more network interfaces and through corresponding network devices; and re-routing the first partial data by transmitting to the reception device the first partial data, which is to be transmitted to the reception device through a first network interface among the two or more network interfaces, through at least one second network interface among the two or more network interfaces when a re-routing request is received from a network device corresponding to the first network interface, wherein the re-routing request indicates that an access state between the network device and the reception device is an abnormal state, wherein in response to the re-routing request, the controller is configured to simultaneously transmit the first partial data and the second partial data over the at least one second network interface, and wherein the second partial data divided from the data are being transmitted over the at least one second network interface.

17. The method of claim 16, further comprising:

receiving normal state information informing that an access state between the network device and the reception device is switched to a normal state; and transmitting the first partial data to the reception device through the two or more network interfaces after receiving the normal state information.

* * * * *